US008456542B2

(12) United States Patent
Niinami

(10) Patent No.: US 8,456,542 B2
(45) Date of Patent: Jun. 4, 2013

(54) IMAGING APPARATUS THAT DETERMINES A BAND OF SOUND AND EMPHASIZES THE BAND IN THE SOUND

(75) Inventor: Norikatsu Niinami, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 299 days.

(21) Appl. No.: 12/909,317

(22) Filed: Oct. 21, 2010

(65) Prior Publication Data

US 2011/0102619 A1 May 5, 2011

(30) Foreign Application Priority Data

Nov. 4, 2009 (JP) ................................. 2009-253154

(51) Int. Cl.
*H04N 5/76* (2006.01)
*G03B 17/24* (2006.01)

(52) U.S. Cl.
USPC ........................................ 348/231.4; 396/312

(58) Field of Classification Search
USPC ............. 348/231.4, 222.1; 396/312; 386/224, 386/227
See application file for complete search history.

(56) References Cited

U.S. PATENT DOCUMENTS

| 5,337,367 | A | * | 8/1994 | Maeda | ........................ | 381/94.7 |
|---|---|---|---|---|---|---|
| RE40,054 | E | * | 2/2008 | Girod | ........................ | 348/14.12 |
| 7,483,061 | B2 | * | 1/2009 | Fredlund et al. | ........... | 348/231.4 |
| 8,218,033 | B2 | * | 7/2012 | Oku et al. | ................ | 348/240.99 |
| 2006/0291816 | A1 | * | 12/2006 | Ozawa | ........................ | 386/96 |
| 2010/0002940 | A1 | * | 1/2010 | Aoki et al. | ..................... | 382/209 |
| 2010/0040359 | A1 | * | 2/2010 | Maeda | ........................ | 396/213 |
| 2011/0052139 | A1 | * | 3/2011 | Oku | ........................ | 386/224 |
| 2011/0069201 | A1 | * | 3/2011 | Kawanishi et al. | ........ | 348/231.4 |
| 2012/0050570 | A1 | * | 3/2012 | Jasinski et al. | ............. | 348/231.4 |
| 2012/0154632 | A1 | * | 6/2012 | Ota | ........................ | 348/231.4 |

FOREIGN PATENT DOCUMENTS

| JP | 2000-187499 | | | 7/2000 |
| JP | 2007013255 | A | * | 1/2007 |
| JP | 2010111275 | A | * | 5/2010 |
| JP | 2010135876 | A | * | 6/2010 |

* cited by examiner

*Primary Examiner* — John Villecco
(74) *Attorney, Agent, or Firm* — Oblon, Spivak, McClelland, Maier & Neustadt, L.L.P.

(57) ABSTRACT

An imaging apparatus includes an imaging device configured to image an object, a sound receiving device configured to receive an ambient sound, a phonation determining device configured to determine whether the object imaged by the imaging device is producing a sound or not, an object characteristic determining device configured to determine a characteristic of the object if the phonation determining device determines that the object is producing the sound, a band determining device configured to determine a band of the ambient sound which suits the characteristic of the object and emphasize the band in the ambient sound, and a recording device configured to record the ambient sound in which the band is emphasized.

7 Claims, 3 Drawing Sheets

IMAGING APPARATUS THAT DETERMINES A BAND OF SOUND AND EMPHASIZES THE BAND IN THE SOUND

CROSS-REFERENCE TO RELATED APPLICATION

The present application is based on and claims priority from Japanese Patent Application No. 2009-253154, filed on Nov. 4, 2009, the disclosure of which is hereby incorporated by reference in its entirety.

BACKGROUND OF THE INVENTION

1. Field of the Invention

The present invention relates to an imaging apparatus which records a sound.

2. Description of the Related Art

In an imaging apparatus such as a video camera, a sound is recorded along with a moving image. Normally, when the sound is recorded, an ambient sound including noise is also recorded. A voice produced by an object or the like, that is, the sound desired to be recorded, is recorded with the ambient sound including the noise or the like. Therefore, the sound desired to be recorded can not be clearly recorded.

Japanese Patent Application Publication No. 2000-187499 discloses a method having steps of detecting whether a mouth of an utterer is open or not to detect a period within which a sound is being produced, and limiting a voice band of the sound while the sound is being produced to more clearly recognize the voice of the utterer.

However, in the method disclosed in Japanese Patent Application Publication No. 2000-187499, whether the utterer is an adult or a child is not considered during sound recognition processing. Normally, a frequency band of an adult's voice and a frequency band of a child's voice are different. Therefore, the voice of the utterance is buried in the surrounding noise with the method disclosed in Japanese Patent Application Publication No. 2000-187499 so that the voice may not be clearly recorded.

SUMMARY OF THE INVENTION

An object of the present invention is to solve the above-described problems, and to provide an imaging apparatus which clearly records the voice of the person to be photographed.

In order to solve the above-described problems, an imaging apparatus of an embodiment of the present invention includes an imaging device configured to image an object, a sound receiving device configured to receive an ambient sound, a phonation determining device configured to determine whether the object imaged by the imaging device is producing a sound or not, an object characteristic determining device configured to determine a characteristic of the object if the phonation determining device determines that the object is producing the sound, a band determining device configured to determine a band of the ambient sound which suits the characteristic of the object and emphasize the band in the ambient sound, and a recording device configured to record the ambient sound in which the band is emphasized.

DETAILED DESCRIPTION OF THE PREFERRED EMBODIMENTS

Hereinafter, an imaging apparatus according to an embodiment of the present invention will be described in detail with reference to FIGS. 1 to 4.

Figure 1:
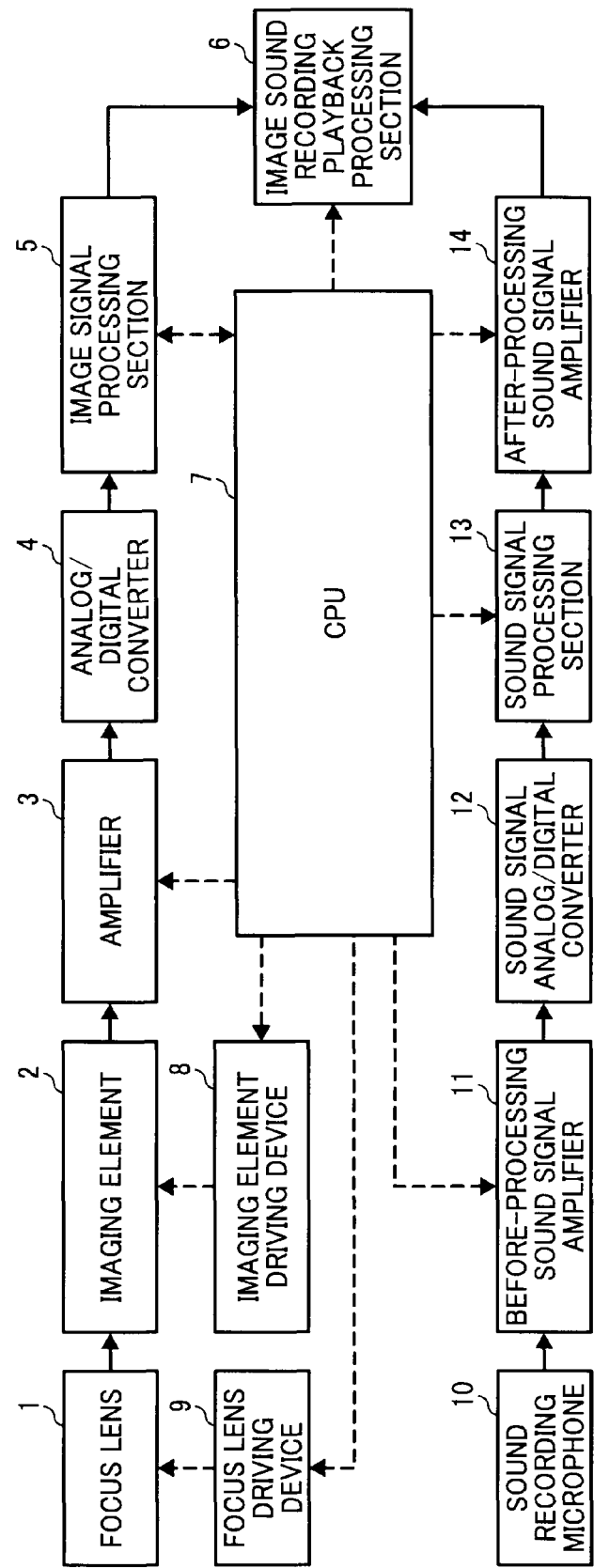
FIG. 1 is a view showing a structure of an imaging apparatus according to an embodiment of the present invention.

An imaging apparatus of an embodiment of the present invention, for example, as shown in FIG. 1, includes an imaging device such as an imaging element 2 configured to image an object, a sound receiving device such as a sound recording microphone 10 configured to receive an ambient sound, a phonation determining device, for example, an image signal processing section 5 configured to determine whether the object imaged by the imaging device is producing a sound or not, an object characteristic determining device, for example, a CPU 7 configured to determine a characteristic of the object if the phonation determining device determines that the object is producing the sound, a band determining device, for example, a sound signal processing section 13 configured to determine a band of the ambient sound which suits the characteristic of the object and emphasize the band in the ambient sound, and a recording device such as an image sound recording playback processing section 6 configured to record the ambient sound in which the band is emphasized.

FIG. 1 shows a structure of the imaging apparatus according to an embodiment of the present invention. The imaging apparatus includes a focus lens 1, the imaging element 2, an amplifier 3, an analog/digital converter 4, the image signal processing section 5, the image sound recording playback processing section 6, the CPU (Central Processing Unit) 7, an imaging element drive (TG) 8, a focus lens driving device 9, the sound recording microphone 10, a before-processing sound signal amplifier 11, a sound signal analog/digital converter 12, the sound signal processing section 13, and an after-processing sound signal amplifier 14.

The focus lens 1 is a lens which forms an image of an object. The imaging element 2 converts the image formed on the imaging element 2 into an electric signal (an image signal). The amplifier 3 amplifies the signal. The analog/digital converter 4 converts an analog signal into a digital signal. The image signal processing section 5 performs processing, as described later, on the image signal. The imaging element driving device (TG) 8 drives the imaging element 2. The focus lens driving device 9 drives the focus lens 1.

In the structure shown in FIG. 1, the image of the object is formed on the imaging element 2 by the focus lens 1. The imaging element 2 converts the image, which is formed by the focus lens, of the object into an electric signal (the image signal), and outputs the signal to the amplifier 3. The amplifier 3 amplifies the image signal output from the imaging element 2. Then, the analog/digital converter 4 converts the amplified image signal into a digital signal to produce a digitized image signal. The image signal processing section 5 performs processing, as described later, on the digitized image signal. Further, the imaging element drive 8 drives the imaging element 2 under control of the CPU 7. The focus lens driving device 9 drives the focus lens 1 under the control of the CPU 7. In sum, as shown in FIG. 1, processing is performed on the image signal of the image of the object. Furthermore, by continuously performing the imaging, the image signals of each of the imaged images are capable of being recorded as a frame image which forms a motion picture.

The sound recording microphone 10 converts an exterior sound into a sound signal. That is, the sound recording microphone 10 functions as a sound receiving device which receives the exterior sound to the imaging apparatus as the sound signal. The before-processing sound signal amplifier 11 amplifies the sound signal. The sound signal analog/digital converter 12 converts an analog sound signal into a digitized sound signal. The sound signal processing section 13 performs the processing, as described later, on the sound signal. The after-processing sound signal amplifier 14 amplifies the sound signal.

In the structure shown in FIG. 1, the exterior sound is received as the sound signal by the microphone 10. The before-processing sound signal amplifier 11 amplifies the sound signal which is received by the microphone 10. The sound signal analog/digital converter 12 converts the sound signal which is amplified by the before-processing sound signal amplifier 11 into a digital signal to produce a digitized sound signal. The sound signal processing section 13 performs processing, as described later, on the sound signal which is digitized by the sound signal analog/digital converter. The after-processing sound signal amplifier 14 amplifies the sound signal on which the processing is performed by the sound signal processer 13. In sum, as shown in FIG. 1, the processing is performed on the sound signal of the exterior sound.

The image sound recording playback processing section 6 combines the image signal on which the processing is performed by the image signal processing section 5 and the sound signal which is amplified by the after-processing sound signal amplifier 14 after the sound signal is processed by the sound signal processing section 13. The image sound recording playback processing section 6 stores the combined signals as image sound data. Further, the image sound recording playback processing section 6 may reproduce the stored image sound data.

The CPU 7 controls the focus lens driving device 9 so as to drive the focus lens 1. The CPU 7 controls the imaging element drive 8 so as to drive the imaging element 2. Further, the CPU 7 may control the amplifier 3, the image signal processing section 5, the before-processing sound signal amplifier 11, the sound signal processing section 13, and the after-processing sound signal amplifier 14.

The sound signal processing section 13 performs processing on the sound signal so that the voice of the object or the like is clearly recognized. There are various possible ways for performing the processing on the sound signal so that the object's voice or the like is clearly recognized. For example, the sound signal processing section 13 may limit, of the received sound signal, the sound signal to a band which suits the object's voice or the like to be output. By performing the processing as just described, it is possible to output the sound signal which is processed such that a person's voice or the like is clearly recognized.

There are various possible ways that the sound signal processing section 13 limits the band of the sound signal to be output. For example, the sound signal processing section 13 may include a band limiting filter circuit (Band-Pass Filter: BPF) which is a filter circuit that limits the band. The band limiting filter circuit may perform a band limitation on the sound. Also, the sound signal processing section 13 may record the sound signal and extract only a part of the signal, which relates to the necessary band, from the recorded sound signal so that the sound signal to be output is produced. Further, the band limitation may be performed such that the sound signal processing section 13 amplifies the signal of a band out of the sound signal and attenuates the signal of the other bands.

Furthermore, in order for a filter quality to be capable of being changed, for example, the sound signal processing section 13 may make the filter quality which best suits the band of an adult's voice and the filter quality which best suits the band of a child's voice capable of being switched over. That is, the sound signal processing section 13 may switch over the band which is to be limited so that either the sound signal which is limited to the band that is suitable for an adult's voice or the sound signal which is limited to the band that is suitable for a child's voice is capable of being output.

Since a frequency band of an adult's voice is 100 to 8,000 Hz, in order to clearly record an adult's voice, only the sound signal between 100 to 8,000 Hz may be extracted and output from the received sound signal. Further, since the frequency band of a child's voice is 150 to 10,000 Hz, in order to clearly record a child's voice, only the sound signal between 150 to 10,000 Hz may be extracted and output from the received sound signal. Furthermore, only the sound signal of the other frequency band may be set to be capable of being extracted and output. For example, the voice of an animal, an engine sound of a car or an airplane or the like may be extracted and output.

The imaging apparatus of the embodiment of the present invention may further include a face detector, for example, the image signal processing section 5 configured to detect a face of the object imaged by the imaging device to obtain a face area, a lip detector, for example, the image signal processing section 5 configured to detect an area of lips of the object in the face area of the detected face if the face of the object is detected by the face detector, and a motion amount detector, for example, the image signal processing section 5 configured to detect a motion amount of the face area and a motion amount of the lips area if the lips area is detected in the face area by the lip detector. The phonation determining device may determine whether the object is producing the sound or not based on the motion amounts of the face area and the lips area, which are detected by the motion amount detector.

The image signal processing section 5 includes the face detector which detects face in the object from an input image data (the image signal). There are various possible ways for detecting face in the object. For example, a method is proposed such that information on characteristics of face may be previously stored, and if the object corresponds to the information, it is that face is detected. Further, the image signal processing section 5 may be set to be capable of detecting other than face. For example, characteristics of animals, cars, or airplanes or the like may be stored, and if the object corresponds to the characteristics, it is judged that cars or airplanes are detected.

Further, the image signal processing section 5 includes a face size measuring device which measures a size of the detected face area. There are various possible ways for measuring the size of the face area. For example, a method in which a percentage of the face area in an image frame is calculated or a method in which simply the face area is calculated may be applied.

Furthermore, the image signal processing section 5 includes the lip detector which detects a lip area in the detected face area. There are various possible ways to detect the lip area. For example, a method is proposed, in which characteristics of lips are stored, and if the object corresponds to the characteristics, it is judged that lips are detected. By the lip detector, whether lips exist or not in the face area may be seen. The area where lips exist may be detected.

Also, the image signal processing section 5 includes the motion amount detector which detects a motion amount of the face area and a motion amount of the lips area between the image frames. As a motion amount of the face area and a motion amount of the lips area, there are various possible ways to be considered as the motion amounts. For example, displacement amounts (vector quantity) of the face area and the lips area in continuous two image-frames may be considered as the motion amounts of the face area and the lips area, respectively.

The image signal processing section 5 includes a phonation determining device which determines whether the object is producing a sound or not based on the motion amounts of the face area and the lips area, which are detected by the motion amount detector. There are various possible ways to determine whether the object is producing the sound or not based on the motion amounts of the face area and the lips area, which is detected by the motion amount detector. For example, the determination may be performed as follows.

Assuming that the motion amount of the face area is Fm and the motion amount of the lips area is Mm, if $|Fm-Mm|>SubA$, it is judged that "the object is producing the sound", and if $|Fm-Mm| \leqq SubB$, it is judged that "the object is not producing the sound". Here, SubA and SubB are constants which satisfy $SubB \leqq SubA$. However, when an angle of view is changed, a size of the area in which the face area occupies on a screen is changed. Therefore, SubA and SubB are changed corresponding to the photographing angle of view.

Further, if $SubB<|Fm-Mm| \leqq SubA$ (1), a result which is determined at the last frame is carried over. That is, when the above-described formula (1) is satisfied, if the determination at the last frame is "the object is producing the sound", it is judged that "the object is producing the sound", and if the determination at the last frame is "the object is not producing the sound", it is judged that "the object is not producing the sound".

By the above-described method, when the determination is "the object is producing the sound", the sound signal to be output may be set to be limited to the band which suits the person's voice by the sound signal processing section 13. For example, when the determination that "the object is producing the sound" is made by the phonation determining device, the image signal processing section 5 gives the CPU 7 a notice of the determination. When the CPU 7 receives the notice, the CPU 7 may control the sound signal processing section 13 so that the band limitation of the sound signal is performed. By performing as described above, it becomes possible to output the sound signal which is processed such that the person's voice is clearly recognized. That is, it becomes possible to record the sound signal which is processed such that the person's voice is clearly recognized.

In the above case, two constants are used, and three cases are described. However, it may be also described with only one constant and two cases. That is to say, if a value of $|Fm-Mm|$ is larger than a prescribed constant, it may be judged that "the object is producing the sound", and if the value of $|Fm-Mm|$ is lower than the prescribed constant, it may be judged that "the object is not producing the sound".

The object characteristic determining device may determine the characteristic of the object by determining whether the object is an adult or a child if the phonation determining device determines that the object is producing the sound. If the object characteristic determining device determines that the object is an adult, the band determining device may determine the band which suits an adult's voice of the ambient sound received by the sound receiving device and emphasize the band. If the object characteristic determining device determines that the object is a child, the band determining device may determine the band which suits a child's voice of the ambient sound received by the sound receiving device and emphasize the band. The recording device may record the ambient sound in which the band of an adult's voice or a child's voice is emphasized.

Further, the imaging apparatus of the embodiment of the present invention may include a distance measuring device configured to measure a distance from the imaging apparatus to the object, a face size measuring device, for example, the image signal processing section 5 configured to measure a size of the face area of the object, which is obtained by the face detector, and a face size calculating device, for example, the CPU 7 configured to calculate a face size of the object based on the distance measured by the distance measuring device and the size of the face area, which is measured by the face size measuring device, if the phonation determining device determines that the object is producing the sound. The object characteristic determining device, for example, the CPU 7 may determine the characteristic of the object by determining whether the object is an adult or a child based on the face size which is calculated by the face size calculating device. If the object characteristic determining device determines that the object is an adult, the band determining device may determine the band which suits an adult's voice of the ambient sound received by the sound receiving device and emphasize the band. Also, if the object characteristic determining device determines that the object is a child, the band determining device may determine the band which suits a child's voice of the ambient sound received by the sound receiving device and emphasize the band. Then, the recording device may record the ambient sound in which the band of an adult's voice or a child's voice is emphasized.

There are various possible ways to measure the distance to the object. For example, a light-emitting section which emits infrared light and a light-receiving section which receives infrared light may be provided. The infrared light is emitted from the light-emitting section, the infrared light is reflected by the object, and then the reflected infrared light is received by the light-receiving section, so that the distance is measured. Also, the distance from the apparatus to the object may be measured by using the image. For example, a phase difference detecting method, a contrast detecting method, or a passive optical method may be applied. For example, the imaging apparatus having an autofocus function measures the distance to the object by using those methods. Therefore, on the imaging apparatus having the autofocus function, a focal point distance to the object, which is output by the autofocus function may be used to measure the distance to the object.

By using the distance to the object, which is measured by the distance measuring device, the position of the focus lens 1 is controlled so that photographing in which the object comes into focus is performed. That is, the distance to the object, which is measured by the distance measuring device is output to the CPU 7. The CPU 7 controls the focus lens driving device 9 based on the distance to the object to drive the focus lens 1 such that the object comes into focus. As a result, the photographing in which the object comes into focus is performed.

The CPU 7 calculates the face size of the object based on the distance to the object, which is measured by the distance measuring device and the face area size of the object, which is measured by the face size measuring device of the image signal processing section 5.

The CPU 7 determines whether the object is an adult or a child based on the calculated face size of the object. There are various possible ways to determine whether the object is an adult or a child based on the face size of the object. For example, the determination may be performed as follows.

Assuming that the face size of the object is F, if $F>\alpha$, it is judged that "the object is an adult", and if $F\leq\beta$, it is judged that "the object is a child". Here, $\alpha$ and $\beta$ are constant which satisfy $\beta\leq\alpha$, and are threshold values to perform the determination. The value of each of $\alpha$ and $\beta$ may be obtained by, for example, previously statistically analyzing the face size of many adults and many children. Also, the value of each of $\alpha$ and $\beta$ may be changed according to the distance to the object.

Further, if $\beta<F\leq\alpha(2)$, the result which is determined at the last frame is carried over. That is, when the above-described formula (2) is satisfied, if the determination at the last frame is "the object is an adult", it is judged that "the object is an adult", and if the determination at the last frame is "the object is a child", it is judged that "the object is a child".

By the method as just described, when it is judged that "the object is an adult", the sound signal may be set to be limited to the band which suits an adult's voice by the sound signal processing section 13. Also, when it is judged that "the object is a child", the sound signal may be set to be limited to the band which suits a child's voice by the sound signal processing section 13. For example, when it is judged that "the object is an adult", the CPU 7 may control the sound signal processing section 13 so that the sound signal is limited to the band which suits an adult's voice, and when it is judged that "the object is a child", the CPU 7 may control the sound signal processing section 13 so that the sound signal is limited to the band which suits a child's voice. By performing as described above, it becomes possible to output the sound signal which is processed such that the person's voice is more clearly recognized. That is, it becomes possible to record the sound signal which is processed such that the person's voice is more clearly recognized.

When a moving image is shot by a digital camera or a video camera, by using the method as described above, it becomes possible to certainly perform a sound recording in which the object's voice is clearly recognized.

Further, in the above case, two constants are used, and three cases are described. However, it may be described with only one constant and two cases. That is to say, if a value of F is larger than a prescribed constant, it may be judged that "the object is an adult", and if the value of F is lower than the prescribed constant, it may be judged that "the object is a child".

Furthermore, when both an adult and a child are in the angle of view, the sound signal may be limited to the band which suits the main object of the adult and the child or to the band which suits a general human voice. There are various possible ways to determine the object to be primal of an adult and a child. For example, on the imaging apparatus which includes the autofocus function, the main object may be the object which is determined to be a main object by the autofocus function. Also, when both of an adult and a child are determined to be the main objects by the autofocus function, the sound signal may be limited to the band which suits an adult's voice or to the band which suit-s a general human voice.

The imaging apparatus of the embodiment of the present invention may further include an outdoor determining device configured to determine whether the photographing is performed outside or not, and a noise eliminating device, for example, the before-processing sound signal amplifier and the after-processing sound signal amplifier configured to eliminate noise from the ambient sound if the outdoor determining device determines that the photographing is performed outside.

The imaging apparatus of the embodiment of the present invention may include the outdoor determining device which determines whether a place where the photographing is performed is outside or not. There are various possible ways to determine whether the place where the photographing is performed is outside or not. For example, by using the method which is performed on the imaging apparatus configured to include an automatic white balance function, it becomes possible to determine whether the place where the photographing is performed is outside or not.

On the imaging apparatus which includes the automatic white balance function, an adjustment of a white balance is performed by speculating a light source at the photographing according to a ratio of R element, B element, and G element on the image signal. That is, it is possible to perform a speculation of the light source at the photographing according to the ratio of the R element, B element, and G element on the image signal. Therefore, if it is speculated that the light source is the sun light by the same method as the imaging apparatus which includes the automatic white balance function, the determination that "the photographing is being performed outside" may be made. Also, if it is speculated that the light source is not the sun light, the determination that "the photographing is not being performed outside" may be made.

The imaging apparatus of the embodiment of the present invention may include the noise eliminating device which eliminates noise caused by wind or the like when the outdoor determining device determines that "the photographing is being performed outside". There are various possible ways to eliminate the noise caused by the wind or the like. For example, it is possible to reduce the noise of the wind by setting a gain of the before-processing sound signal amplifier 11 being lower than the normal gain and setting the gain of the after-processing sound signal amplifier 14 being larger than the normal gain. By performing as just described, even if the photographing is performed outside, it becomes possible to record the sound signal which is processed such that the person's voice is clearly recognized.

Figure 2:
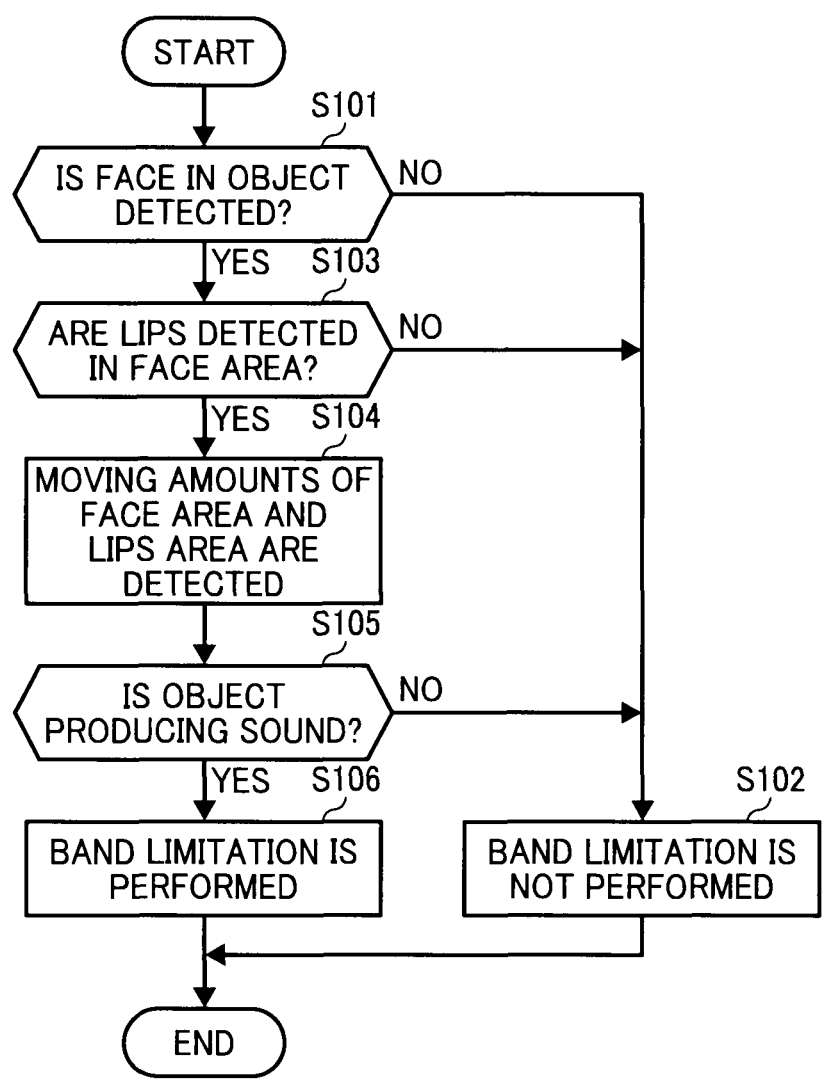
FIG. 2 is a view showing a processing operation in an imaging apparatus of an embodiment of the present invention.

FIG. 2 shows a processing operation in the imaging apparatus of the embodiment of the present invention. The face in the object is detected by the face detector (S101). If the face in the object is not detected (S101, No), the sound signal processing section 13 does not perform the band limitation (S102). That is, the sound signal processing section 13 outputs the sound signal without performing any processing on the received sound signal.

If the face in the object is detected (S101, Yes), the lips are detected in the detected face area by the lip detector (S103). If the lips are not detected in the face area (S103, No), the sound signal processing section 13 does not perform the band limitation (S102). That is, the sound signal processing section 13 outputs the sound signal without performing any processing on the received sound signal.

If the lips are detected in the face area (S103, Yes), the motion amounts of the face area and the lips area are detected by the motion amount detector (S104). Based on the motion amounts, which are detected by the motion amount detector, of the face area and the lips area, a judgment on whether the object is producing the sound or not is made (S105) by the phonation determining device. If it is judged that "the object is producing the sound" (S105, Yes), the band limitation is performed by the sound signal processing section 13 (S106). If it is judge that "the object is not producing the sound" (S105, No), the sound signal processing section 13 does not perform the band limitation (S102). That is, the sound signal processing section 13 outputs the sound signal without performing any processing on the received sound signal.

By performing as described above, the voice of the object is emphasized so that it becomes possible to more clearly record the person's voice. Also, the processing operation as shown in FIG. 2, for example, may be performed on every frame. By performing as just described, a period that the object is producing the sound is precisely known so that it becomes possible to perform the band limitation only during the period that the object is producing the sound.

Figure 3:
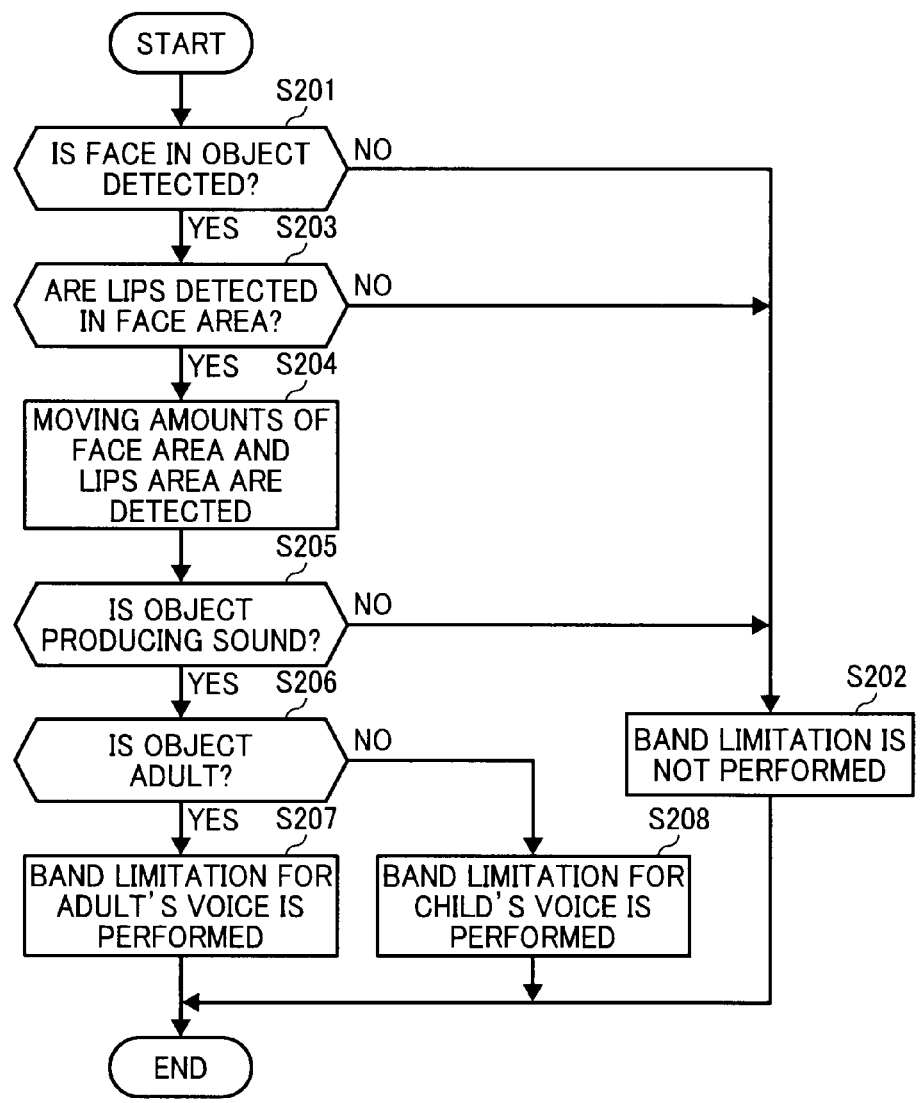
FIG. 3 is a view showing a processing operation in an imaging apparatus of an embodiment of the present invention.

FIG. 3 shows the processing operation in the imaging apparatus of the embodiment of the present invention. The face in the object is detected by the face detector (S201). If the face of the object is not detected (S201, No), the sound signal processing section 13 does not perform the band limitation (S202). That is, the sound signal processing section 13 outputs the sound signal without performing any processing on the received sound signal.

If the face in the object is detected (S201, Yes), the lips are detected in the detected face area by the lip detector (S203). If the lips are not detected in the face area (S203, No), the sound signal processing section 13 does not perform the band limitation (S202). That is, the sound signal processing section 13 outputs the sound signal without performing any processing on the received sound signal.

If the lips are detected in the face area (S203, Yes), the motion amounts of the face area and the lips area are detected by the motion amount detector (S204). Based on the motion amounts, which are detected by the motion amount detector, of the face area and the lips area, the judgment on whether the object is producing the sound or not is made (S205) by the phonation determining device. If it is judge that "the object is not producing the sound" (S205, No), the sound signal processing section 13 does not perform the band limitation (S202). That is, the sound signal processing section 13 outputs the sound signal without performing any processing on the received sound signal.

If it is judged that "the object is producing the sound" (S205, Yes), the CPU 7 calculates the face size of the object based on the distance, which is measured by the distance measuring device, to the object and the size of the face area, which is detected by the face size measuring device of the image signal processing section 5, of the object. Then, based on the calculated face size of the object, the judgment on whether the object is an adult or a child is made (S206). If it is judged that "the object is an adult" (S206, Yes), the sound signal processing section 13 performs the band limitation to limit the sound signal to the band which suits an adult's voice (S207). If it is judged that "the object is a child" (S206, No), the sound signal processing section 13 performs the band limitation which limits the sound signal to the band that suits a child's voice (S208).

By performing as described above, it becomes possible to record only the sound in the band which suits the object's voice, and to more clearly record the person's voice. Also, the processing operation as shown in FIG. 3, for example, may be performed on every frame. By performing as just described, the period in which the object is producing the sound is precisely known. Thus, it becomes possible to perform the band limitation only during the period in which the object is producing the sound.

Figure 4:
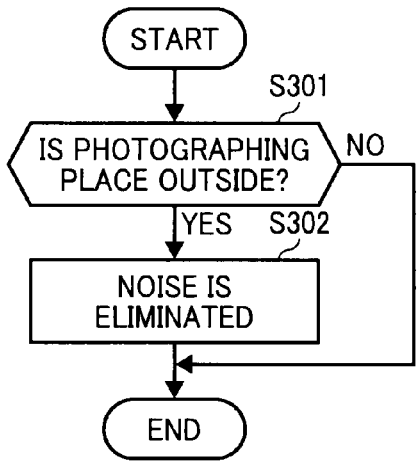
FIG. 4 is a view showing a processing operation in an imaging apparatus of an embodiment of the present invention.

FIG. 4 shows the processing operation in the imaging apparatus of the embodiment of the present invention. Whether the photographing place is outside or not is judged by the outdoor determining device (S301). If it is judged that "the photographing is performed outside" (S301, Yes), the noise of the wind is eliminated by the noise eliminating device (S302).

By performing as just described, the voice of the object is recorded without recording the noise of the wind so that the person's voice is more clearly recorded. Also, the processing operation as shown in FIG. 4, for example, may be performed on every frame. By performing as just described, the elimination of the noise is performed only during the period of being outside.

Further, the processing operation as shown in FIG. 4 may be continuously performed after the processing operation of FIG. 2. By performing as just described, the person's voice is more clearly recorded. Also, the continuous processing operation may be, for example, performed on every frame.

Furthermore, the processing operation as shown in FIG. 4 may be continuously performed after the processing operation of FIG. 3. By performing as just described, the person's voice is more clearly recorded. Also, the continuous processing operation may be, for example, performed on every frame.

The processing operation on the above-described embodiment may be run by software, hardware or a combination of the both.

When the processing is run by the software, the processing may be run by reading the program into a memory (Random Access Memory) installed in the dedicated hardware in a computer from a ROM (Read Only Memory) having the program in which a processing sequence is recorded. Also, the processing may be run by installing the program into a general-purpose computer which is capable of running all sorts of processing.

For example, the program may be previously recorded in the ROM or a hard disk as a recording medium. Or the program may be temporarily or permanently stored (recorded) in removable recording media which may be a magnetic disk such as a floppy (registered trademark) disk or the like, an optical disk such as a CD (Compact Disc) or a DVD (Digital Versatile Disk) or the like, or a magneto optical disk or the like such as an MO (Magneto Optical) Disk or the like.

The removable recording media as just described may be offered as so-called a packaged software.

Further, the program may be installed into the computer not only by using the removable recording media as described above, but also by being wirelessly transferred from a download site to the computer and by being transferred by a cable through a network such as a LAN (Local Area Network) or the internet. The computer receives the transferred program and installs the program into the recording medium such as a built-in hard disk or the like.

Further, the processing may be set to be run not only in a time-series according to the processing operation described in the above embodiment, but also individually or paratactically according to a necessity or a processing capacity of the apparatus which runs the processing.

Furthermore, the system described in the above embodiment may be set to be a structure in which more than one apparatuses are logically assembled or functions of each of the apparatuses are mixed.

Hereinbefore, the present invention has been described in the preferred embodiment of the present invention. Although the present invention has been described in terms of exemplary embodiments, it is not limited thereto. It should be appreciated that various alterations or modifications may be made in the embodiment described by persons skilled in the art without departing from the wide scope of the present invention as defined by the following claims.

Further, the imaging apparatus of the embodiment of the present invention may include the face detector configured to detect a face of the object imaged by the imaging device to obtain a face area, the lip detector configured to detect an area of lips of the object in the face area of the detected face if the face of the object is detected by the face detector, and the motion amount detector configured to detect a motion amount of the face area and a motion amount of the lips area if the lips area is detected in the face area by the lip detector, wherein the phonation determining device determines whether the object is producing the sound or not based on the motion amounts of the face area and the lips area, which are detected by the motion amount detector.

Furthermore, the imaging apparatus of the embodiment of the present invention may include the object characteristic determining device which determines the characteristic of the object by determining whether the object is an adult or a child if the phonation determining device determines that the object is producing the sound. If the object characteristic determining device determines that the object is an adult, the band determining device may determine the band which suits an adult's voice of the ambient sound received by the sound receiving device and emphasize the band. If the object characteristic determining device determines that the object is a child, the band determining device may determine the band which suits a child's voice of the ambient sound received by the sound receiving device and emphasize the band. Then, the recording device records the ambient sound in which the band of an adult's voice or a child's voice is emphasized.

Also, the imaging apparatus of the embodiment of the present invention may include the distance measuring device configured to measure a distance from the imaging apparatus to the object, the face size measuring device configured to measure a size of the face area of the object, which is obtained by the face detector, and the face size calculating device configured to calculate a face size of the object based on the distance measured by the distance measuring device and the size of the face area, which is measured by the face size measuring device, if the phonation determining device determines that the object is producing the sound. The object characteristic determining device may determine the characteristic of the object by determining whether the object is an adult or a child based on the face size which is calculated by the face size calculating device. If the object characteristic determining device determines that the object is an adult, the band determining device may determine the band which suits an adult's voice of the ambient sound received by the sound receiving device and emphasize the band. If the object characteristic determining device determines that the object is a child, the band determining device may determine the band which suits a child's voice of the ambient sound received by the sound receiving device and emphasize the band. And the recording device may record the ambient sound in which the band of an adult's voice or a child's voice is emphasized.

The imaging apparatus of the embodiment of the present invention may include the outdoor determining device configured to determine whether photographing is performed outside or not, and the noise eliminating device configured to eliminate noise from the ambient sound if the outdoor determining device determines that the photographing is performed outside.

With the present invention, the voice of the person who is the object of photographing is clearly recorded.

What is claimed is:

1. An imaging apparatus, comprising:
an imaging device configured to image an object;
a sound receiving device configured to receive an ambient sound;
a phonation determining device configured to determine whether the object imaged by the imaging device is producing a sound or not;
an object characteristic determining device configured to determine a characteristic of the object if the phonation determining device determines that the object is producing the sound;
a band determining device configured to determine a band of the ambient sound which suits the characteristic of the object and emphasize the band in the ambient sound; and
a recording device configured to record the ambient sound in which the band is emphasized, wherein
the object characteristic determining device determines the characteristic of the object by determining whether the object is an adult or a child if the phonation determining device determines that the object is producing the sound.

2. The imaging apparatus according to claim 1, further comprising:
a face detector configured to detect a face of the object imaged by the imaging device to obtain a face area;
a lip detector configured to detect an area of lips of the object in the face area of the detected face if the face of the object is detected by the face detector; and
a motion amount detector configured to detect a motion amount of the face area and a motion amount of the lips area if the lips area is detected in the face area by the lip detector, wherein
the phonation determining device determines whether the object is producing the sound or not based on the motion amounts of the face area and the lips area, which are detected by the motion amount detector.

3. The imaging apparatus according to claim 1, wherein:
if the object characteristic determining device determines that the object is an adult, the band determining device determines the band which suits an adult voice of the ambient sound received by the sound receiving device and emphasizes the band;
if the object characteristic determining device determines that the object is a child, the band determining device determines the band which suits a child voice of the ambient sound received by the sound receiving device and emphasizes the band; and
the recording device records the ambient sound in which the band of an adult's voice or a child's voice is emphasized.

4. The imaging apparatus according to claim 2, wherein:
if the object characteristic determining device determines that the object is an adult, the band determining device determines the band which suits an adult's voice of the ambient sound received by the sound receiving device and emphasizes the band;
if the object characteristic determining device determines that the object is a child, the band determining device determines the band which suits a child's voice of the ambient sound received by the sound receiving device and emphasizes the band; and
the recording device records the ambient sound in which the band of an adult's voice or a child's voice is emphasized.

5. The imaging apparatus according to claim 1, further comprising
an outdoor determining device configured to determine whether photographing is performed outside or not; and a noise eliminating device configured to eliminate noise from the ambient sound if the outdoor determining device determines that the photographing is performed outside.

6. An imaging apparatus, comprising:
an imaging device configured to image an object;
a sound receiving device configured to receive an ambient sound;
a phonation determining device configured to determine whether the object imaged by the imaging device is producing a sound or not;
an object characteristic determining device configured to determine a characteristic of the object if the phonation determining device determines that the object is producing the sound;
a band determining device configured to determine a band of the ambient sound which suits the characteristic of the object and emphasize the band in the ambient sound; and
a recording device configured to record the ambient sound in which the band is emphasized;
a face detector configured to detect a face of the object imaged by the imaging device to obtain a face area;
a lip detector configured to detect an area of lips of the object in the face area of the detected face if the face of the object is detected by the face detector;
a motion amount detector configured to detect a motion amount of the face area and a motion amount of the lips area if the lips area is detected in the face area by the lip detector, wherein
the phonation determining device determines whether the object is producing the sound or not based on the motion amounts of the face area and the lips area, which are detected by the motion amount detector;
a distance measuring device configured to measure a distance from the imaging apparatus to the object;
a face size measuring device configured to measure a size of the face area of the object, which is obtained by the face detector; and
a face size calculating device configured to calculate a face size of the object based on the distance measured by the distance measuring device and the size of the face area, which is measured by the face size measuring device, if the phonation determining device determines that the object is producing the sound, wherein:
the object characteristic determining device determines the characteristic of the object by determining whether the object is an adult or a child based on the face size which is calculated by the face size calculating device,
if the object characteristic determining device determines that the object is an adult, the band determining device determines the band which suits an adult's voice of the ambient sound received by the sound receiving device and emphasize the band;
if the object characteristic determining device determines that the object is a child, the band determining device determines the band which suits a child's voice of the ambient sound received by the sound receiving device and emphasize the band; and
the recording device records the ambient sound in which the band of an adult's voice or a child's voice is emphasized.

7. An imaging apparatus, comprising:
an imaging device configured to image an object;
a sound receiving device configured to receive an ambient sound;
a face detector configured to detect a face of the object imaged by the imaging device to obtain a face area;
a lip detector configured to detect an area of lips of the object in the face area of the detected face if the face of the object is detected by the face detector;
a motion amount detector configured to detect a motion amount of the face area and a motion amount of the lips area if the lips area is detected in the face area by the lip detector;
a phonation determining device configured to determine whether the object imaged by the imaging device is producing the sound or not based on the motion amounts of the face area and the lips area, which are detected by the motion amount detector;
a band determining device configured to determine a prescribed band of the ambient sound received by the sound receiving device and emphasize the band if the phonation determining device determines that the object is producing the sound;
an object characteristic determining device configured to determine whether the object is an adult or a child if the phonation determining device determines that the object is producing the sound; and
a recording device configured to record the ambient sound in which the prescribed band is emphasized.

* * * * *